(12) United States Patent
Uskert et al.

(10) Patent No.: US 9,421,733 B2
(45) Date of Patent: *Aug. 23, 2016

(54) MULTI-LAYER CERAMIC COMPOSITE POROUS STRUCTURE

(75) Inventors: Richard Christopher Uskert, Timonium, MD (US); Ted Joseph Freeman, Avon, IN (US); David John Thomas, Brownsburg, IN (US); Jay Lane, Mooresville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1186 days.

This patent is subject to a terminal disclaimer.

(21) Appl. No.: 13/337,106

(22) Filed: Dec. 24, 2011

(65) Prior Publication Data

US 2012/0266603 A1    Oct. 25, 2012

Related U.S. Application Data

(60) Provisional application No. 61/428,701, filed on Dec. 30, 2010.

(51) Int. Cl.
*F02C 1/00* (2006.01)
*B32B 5/18* (2006.01)
(Continued)

(52) U.S. Cl.
CPC . *B32B 5/18* (2013.01); *B32B 5/22* (2013.01); *B32B 5/24* (2013.01); *B32B 5/245* (2013.01); *B32B 5/26* (2013.01); *B32B 9/005* (2013.01); *B32B 9/007* (2013.01); *B32B 9/046* (2013.01); *B32B 18/00* (2013.01); *F01D 5/18* (2013.01); *B32B 2250/03* (2013.01); *B32B 2250/20* (2013.01); *B32B 2250/40* (2013.01); *B32B 2250/42* (2013.01); *B32B 2260/04* (2013.01); *B32B 2266/04* (2013.01); *B32B 2266/06* (2013.01); *B32B 2307/306* (2013.01); *B32B 2307/724* (2013.01); *B32B 2307/726* (2013.01); *B32B 2603/00* (2013.01); *C04B 2237/38* (2013.01); *C04B 2237/62* (2013.01); *F05D 2300/6033* (2013.01); *F05D 2300/612* (2013.01); *Y10T 156/10* (2015.01); *Y10T 428/24331* (2015.01); *Y10T 428/24997* (2015.04); *Y10T 442/335* (2015.04)

(58) Field of Classification Search
CPC ............ F23R 3/00; F23R 3/007; B32B 5/18; B32B 9/005; B32B 9/046; B32B 18/00; F05D 2300/6033
See application file for complete search history.

(56) References Cited

U.S. PATENT DOCUMENTS 3,930,085 A    12/1975    Pasiuk
5,409,651 A    4/1995    Head
(Continued)

OTHER PUBLICATIONS

International Search Report and Written Opinion, PCT/US2011/067409, Rolls-Royce North American Technologies Inc., Apr. 26, 2012.

*Primary Examiner* — Gerald L Sung
(74) *Attorney, Agent, or Firm* — Brinks Gilson & Lione

(57) ABSTRACT

An article of manufacture includes a first ceramic matrix composite (CMC) sheet having a number of flow passages therethrough, and an open-cell foam layer bonded to the first CMC sheet. The open-cell foam layer is an open-cell foam. The article of manufacture includes a second CMC sheet bonded to the open-cell foam layer, the second CMC sheet having a thermal and environmental barrier coating and having a number of flow passages therethrough.

19 Claims, 3 Drawing Sheets

(51) Int. Cl.
  *F01D 5/18* (2006.01)
  *B32B 9/00* (2006.01)
  *B32B 9/04* (2006.01)
  *B32B 18/00* (2006.01)
  *B32B 5/22* (2006.01)
  *B32B 5/24* (2006.01)
  *B32B 5/26* (2006.01)

(56) References Cited

U.S. PATENT DOCUMENTS

| | | | |
|---|---|---|---|
| 5,572,725 A * | 11/1996 | Morris et al. | 428/555 |
| 5,582,784 A | 12/1996 | Daws | |
| 5,605,046 A * | 2/1997 | Liang | F01D 5/183 |
| | | | 60/266 |
| 5,804,306 A | 9/1998 | Sorenson et al. | |
| 5,849,406 A | 12/1998 | Daws | |
| 6,077,600 A | 6/2000 | Atmur et al. | |
| 6,134,881 A | 10/2000 | Strasser et al. | |
| 6,419,189 B1 | 7/2002 | DiChiara, Jr. et al. | |
| 6,443,700 B1 | 9/2002 | Grylls et al. | |
| 6,514,046 B1 * | 2/2003 | Morrison et al. | 416/229 A |
| 6,558,785 B1 | 5/2003 | Rawal et al. | |
| 6,592,981 B1 | 7/2003 | Rawal et al. | |
| 6,986,940 B1 | 1/2006 | Carper | |
| 7,153,464 B2 | 12/2006 | Millard et al. | |
| 7,263,772 B2 * | 9/2007 | Prociw et al. | 29/890 |
| 2004/0110041 A1 * | 6/2004 | Merrill | C04B 35/185 |
| | | | 428/699 |
| 2005/0022921 A1 * | 2/2005 | Morrison et al. | 156/89.11 |
| 2007/0172639 A1 | 7/2007 | Kmetz | |
| 2010/0236759 A1 * | 9/2010 | Wadley et al. | 165/104.19 |
| 2012/0167574 A1 | 7/2012 | Uskert | 60/754 |
| 2013/0084189 A1 | 4/2013 | Diego | 416/241 B |

* cited by examiner

MULTI-LAYER CERAMIC COMPOSITE POROUS STRUCTURE

RELATED APPLICATIONS

The present application claims the benefit of U.S. Provisional Patent Application No. 61/428,701 filed Dec. 30, 2010 which is incorporated herein by reference.

BACKGROUND

The technical field generally relates to high-temperature, light-weight materials. Ceramic matrix composite materials in the presently known art have limitations in the structural capabilities and the cooling methods available. Presently available ceramic components are cooled by direct flow or impingement cooling. Further, presently available metal materials require high cooling loads to achieve sufficient cooling in high-temperature applications, requiring low temperature cooling fluids and/or high cooling fluid flow rates. Therefore, further technological developments are desirable in this area.

SUMMARY

One embodiment is a unique article of manufacture including a ceramic matrix composite, an open cell foam layer and another ceramic matrix composite bonded thereto. Other embodiments include unique methods, systems, and apparatus to related to the article of manufacture and method of manufacture. Further embodiments, forms, objects, features, advantages, aspects, and benefits shall become apparent from the following description and drawings.

DESCRIPTION OF THE ILLUSTRATIVE EMBODIMENTS

Figure 1A:
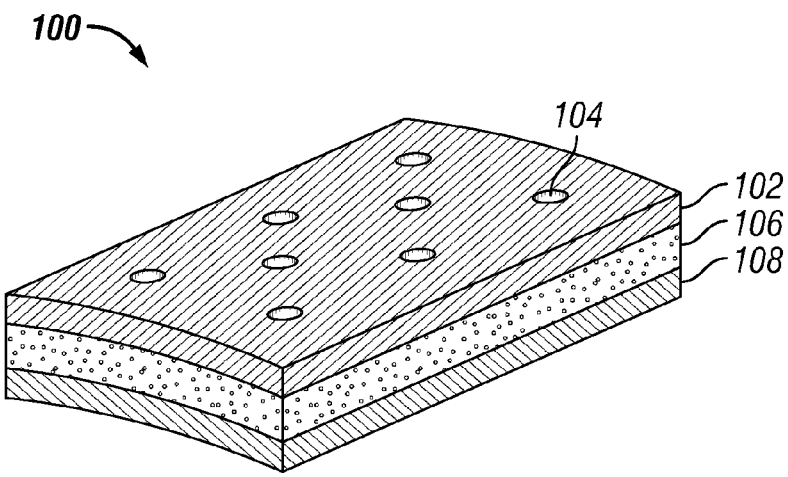
FIG. 1*a* is a schematic diagram of a multi-layer porous composite structure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1B:
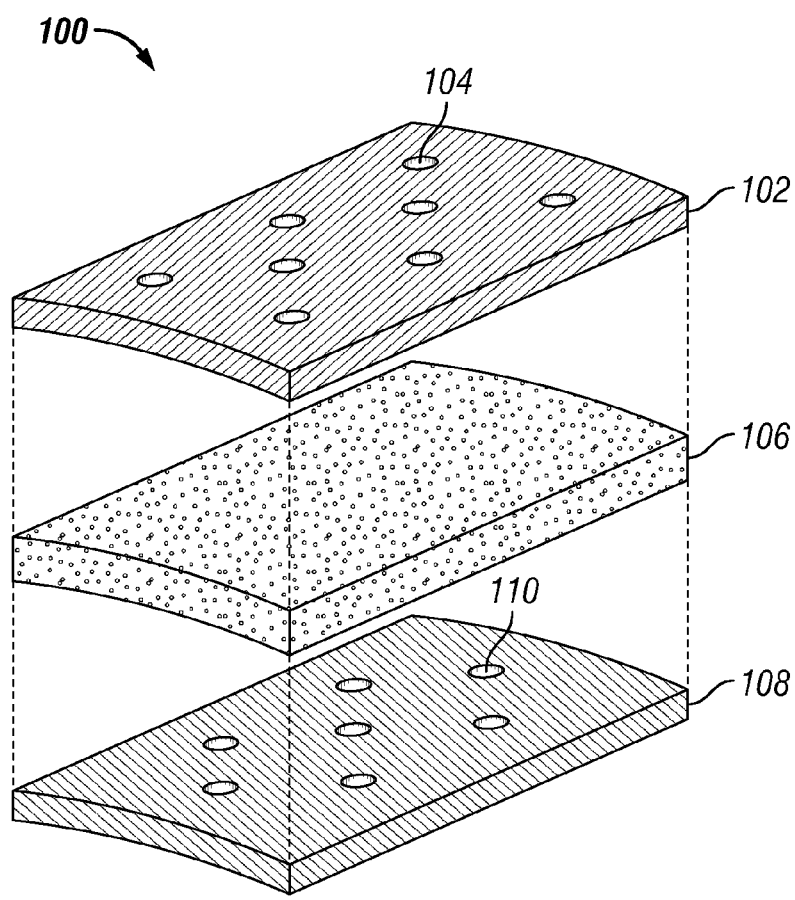
FIG. 1*b* is an exploded view of a multi-layer porous composite structure.
Figure 2:
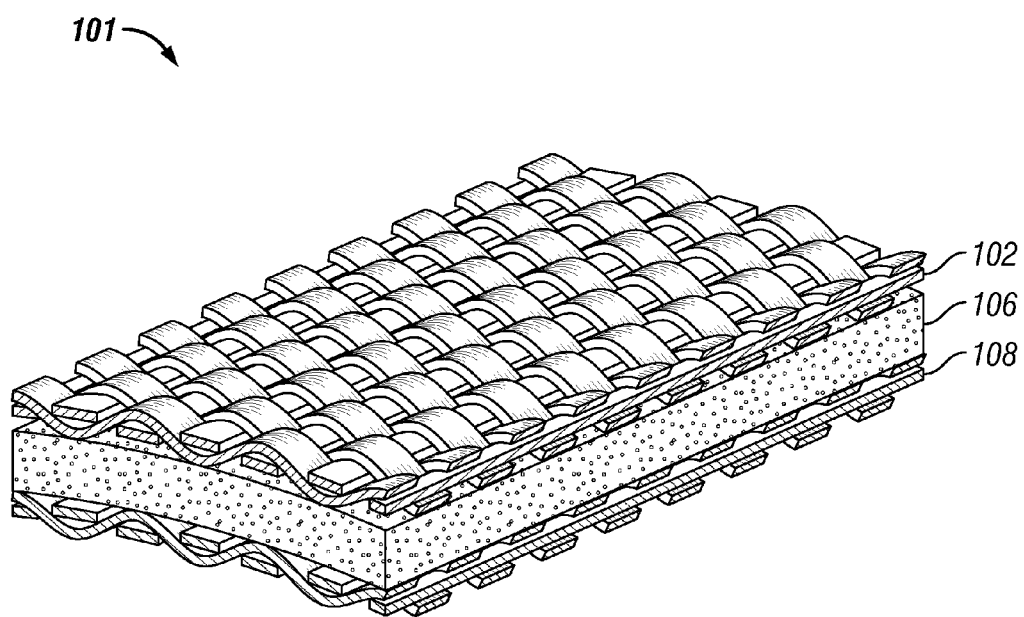
FIG. 2 is a schematic diagram of a multi-layer porous composite structure having a woven layer.

Referencing FIG. 1, an article of manufacture 100 is illustrated having a first ceramic matrix composite (CMC) sheet 102. In certain embodiments, the CMC sheet may be woven (e.g. reference FIG. 2), braided, or formed by standard processing. The article 100 includes flow passages 104 through the first CMC sheet 102, and a permeable structure layer 106 bonded to the first CMC sheet 102. An example permeable structure layer 106 is an open-cell foam layer 106 that allows fluid flow through the bulk of the foam. Alternatively or additionally, the permeable structure layer 106 includes an open celled lattice structure. The permeable structure layer 106 includes any high temperature capable material known in the art. The reference hereinafter to the permeable structure layer 106 as an open-cell foam layer 106 is to provide for a clear description, and is non-limiting to the permeable structure layer 106.

The article of manufacture 100 further includes a second CMC sheet 108 bonded to the open-cell foam layer 106. The flow permeability through the foam and the structural contribution of the foam layer to the article 100 are selectable according to the foam cell sizing and density.

Figure 4:
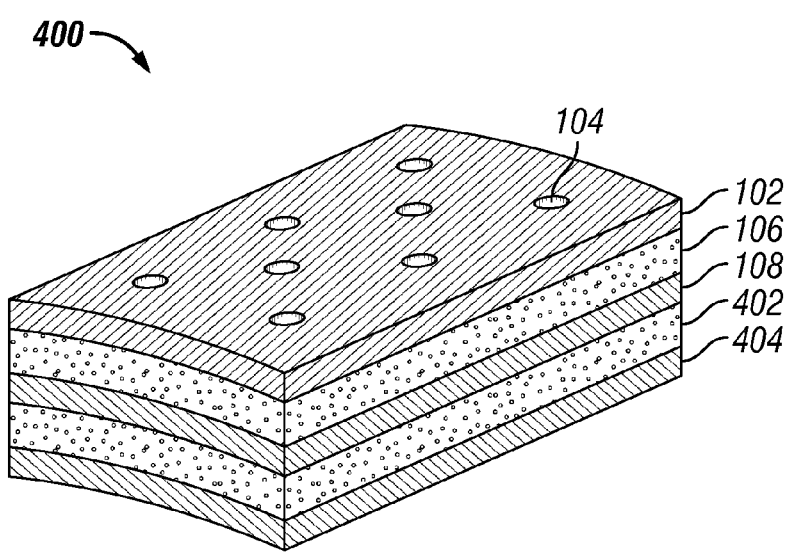
FIG. 4 is schematic diagram of another multi-layer porous composite structure.

An exemplary embodiment includes forming and rigidizing the first CMC sheet 102 before application and bonding of the open-cell foam sheet 106, then applying the second CMC sheet 108. In certain embodiments, article 100 further includes flow passages 110 (reference FIG. 1*b*) through the second CMC sheet 108. The article 100 may be processed to completion (e.g. rigidizing and de-greening the article) after the application of the second CMC sheet 108, or the second CMC sheet 108 may be rigidized before the application of further layers. An exemplary article of manufacture 400 (reference FIG. 4) includes additional open-cell foam layer(s) 402, each additional open-cell foam layer 402 bonded to and alternated with a CMC sheet (108, 404). Each of the CMC sheets (102, 108, 404) may be perforated (drilled, punched, etc.) after rigidizing. In certain embodiments, one or more of the sheets 102, 108, 404 do not include flow passages therethrough. In certain embodiments, the flow passages through the sheets 102, 108, 404 are inherent to the sheet construction—for example where the sheets 102, 108, 404 have a braided or woven construction having gas permeable gaps.

Returning to FIG. 1*a*, in certain embodiments, the perforations 104, 110 may be staggered or aligned to facilitate the desired flow permeability through the article 100. For example, the perforations 104, 110 may be in any degree of alignment between direct alignment and maximum possible average offset. The flow permeability through the article 100 is further selectable with the sizing and count of the perforations 104, 110. Thus, a configurable flow permeability is provided through the article 100, or from the interior of the article 100 through one or both of the sheets 102, 108. In certain embodiments, perforations 104, 110 may be applied perpendicular to the surface of the sheets 102, 108, or at any inclined angle relative to the sheets 102, 108.

The article of manufacture 100 may be a component including a cooled gas turbine engine combustion chamber liner, a non-cooled gas turbine engine combustion chamber liner, a cooled gas turbine engine exhaust liner, a non-cooled gas turbine engine exhaust liner, a cooled rotating blade for a gas turbine, a non-cooled rotating blade for a gas turbine, a cooled vane for a gas turbine, and/or a non-cooled vane for a gas turbine. In certain embodiments, the second CMC sheet 108 includes a thermal and environmental barrier coating. Any of the CMC sheets 102, 108, 404, and especially any CMC sheets exposed to a heated and/or corrosive environment, may include a thermal and/or environmental barrier coating.

Figure 3:
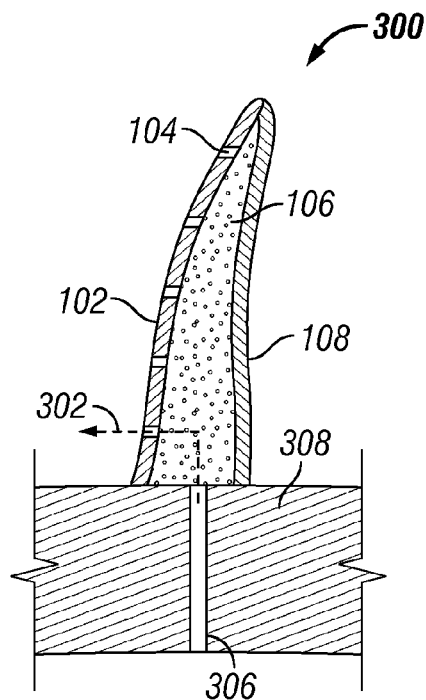
FIG. 3 is a schematic diagram of a component formed from a multi-layer porous composite structure.

Referencing FIG. 3, schematic diagram of a component 300 formed from a multi-layer porous composite structure is illustrated. The exemplary component 300 is a compressor blade, a turbine blade, or a stator vane. The component includes a first CMC sheet 102, a second CMC sheet 108, and an open-cell foam layer 106. The component 300 is mechanically coupled to a base 308 (e.g. a compressor hub), the base 308 including a coolant passage 306 that flows coolant into the component 300. The exemplary component 300 includes flow passages 104 in only one of the CMC sheets, where the coolant flow 302 enters the gases passing by the component 300. A component 300 may include flow passages 104 in either of the sheets 102, 108, and/or both of the sheets 102, 108. In certain embodiments, the component 300 is a ceramic composite component that withstands high temperatures and has some internal cooling capability from the coolant flow 302 therethrough. The heat transfer value from the component 300 to the coolant flow 302 may be provided at a lower value than a heat transfer value that would be required for a metallic component to avoid failure. Accordingly, adjustments to the size of the coolant passage 306, the coolant flow rate, the coolant temperature, and/or other modification of the coolant flow environment through the component 300 may be made to lower costs and/or improve reliability of the component 300 relative to a metallic component performing a similar structural function. Exemplary, non-limiting adjustments include: providing a smaller coolant passage 306, providing a lower coolant flow rate, and providing a higher coolant temperature.

The procedural descriptions which follow provide an illustrative embodiment of performing procedures for providing a multi-layer ceramic composite porous structure. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes an operation to provide a multi-layer ceramic matrix composite (CMC) component having two opposing CMC sheets and an open-cell foam layer therebetween. The procedure further includes an operation to expose one of the CMC sheets directly to high-temperature turbine engine gases. The exemplary procedure further includes an operation to flow a coolant fluid through the open-cell foam layer and through at least one of the CMC sheets. In certain embodiments, the procedure further includes exposing the CMC sheet directly to high-temperature turbine engine gases by flowing turbine engine combustion gases in contact with the CMC sheet. Exemplary embodiments include rotating the multi-layer CMC component during the exposing, for example where the multi-layer CMC component is a rotating blade including a combustion gas turbine blade mechanically coupled to an upstream compressor blade.

In certain embodiments, the procedure includes providing a first heat transfer value from the multi-layer CMC component to the coolant fluid that is lower than a second heat transfer value. The second heat transfer value is a required heat transfer for a metal component. The heat transfer values comprise an amount of heat removed from the component per unit of time relative to a given exhaust temperature and flow rate. In certain embodiments, the heat transfer value is relatable to an operating temperature of the component, where the second heat transfer value is lowered thereby providing a higher operating temperature for the multi-layer CMC component than would be required for a metal component performing an identical structural task. The metal component may be a superalloy, steel, titanium, aluminum, or other metal component that could be configured to provide a mechanically similar function in a similar application.

Another exemplary procedure includes an operation to form a first ceramic matrix composite (CMC) sheet, and an operation to provide a number of flow paths therethrough (e.g. by perforating the first CMC sheet or by forming the CMC sheet with inherent gas permeable passageways). The procedure further includes an operation to rigidize the first CMC sheet into a component shape. In certain embodiments, the rigidizing is performed before the providing the flow paths.

The procedure further includes an operation to bond a shaped, open-cell foam layer to the first CMC sheet, where the shaped, open-cell foam layer has a shape corresponding to the component shape. For example, the component may be an airfoil vane utilized in a turbine engine, and the first CMC sheet and open-cell foam layer form one face and an interior of the airfoil vane. The exemplary procedure further includes an operation to form a second CMC sheet, and an operation to bond the second CMC sheet to the foam layer thereby forming a component structure. The procedure further includes an operation to cure the component structure. In certain embodiments, the procedure includes an operation to provide a number of flow paths through the second CMC sheet before the operation to bond the second CMC sheet. In certain embodiments, the procedure includes an operation to apply a thermal and environmental barrier coating to the second CMC sheet.

In certain embodiments, the exemplary procedure further includes, before the curing the component structure, an operation to rigidize the second CMC sheet, to bond a second shaped, open-cell foam layer to the second CMC sheet, to form a third CMC sheet, and to bond the third CMC sheet to the second foam layer thereby enlarging the component structure. Certain embodiments of the procedure include operations to add open-cell foam layers and additional CMC sheet layers to build the component to a specified configuration.

An exemplary embodiment of the procedure includes an operation to determine a component strength requirement, and in response to the component strength requirement, to determine at least one design parameter. The design parameter includes a number of layers each layer comprising an open-cell foam layer interposed between two CMC sheets, a thickness of each of the CMC sheets, a density of the open-cell foam layer, and/or a geometric shape of the component structure. The procedure further includes conforming the component structure to the design parameter(s).

Another exemplary embodiment of the procedure includes an operation to determine a component cooling capability requirement, and in response to the component cooling capability requirement, to determine at least one design parameter. The design parameter includes a sizing of the flow paths, a shape factor of the flow paths, an alignment value of the flow paths, a thermal and environmental barrier coating design, and/or a density of the open-cell foam layer.

An exemplary shape factor includes a contribution of the pressure drop of flow through the component that results from the geometrical aspects of the component, including the component thickness, overall shape, the number of flow paths provided in the CMC sheets and open-cell foam layer, and other geometrical aspects understood in the art. An exemplary alignment value of the flow paths includes a degree to which an average flow path provided in a first CMC sheet aligns or is displaced from an average flow path provided in a second CMC sheet. The procedure further includes an operation to conform the component structure to the design parameter.

As is evident from the figures and text presented above, a variety of embodiments according to the present invention are contemplated.

An exemplary embodiment is an article of manufacture, including a first ceramic matrix composite (CMC) sheet having flow passages therethrough and an open-cell foam layer bonded to the first CMC sheet. The article of manufacture further includes a second CMC sheet bonded to the open-cell foam layer. Certain embodiments of the article of manufacture include a number of flow passages through the second CMC sheet, and the perforations may be staggered or aligned to facilitate the desired flow permeability through the article of manufacture, or through the relevant portion of the article of manufacture. The flow passages may be perforations in the first and/or second CMC sheets. In certain embodiments, the flow passages are gas permeable gaps in the CMC sheets formed by woven and/or braided CMC sheets. The article of manufacture may include additional open-cell foam layers, with each open-cell foam layer bonded with and alternated with a CMC sheet.

In certain embodiments, the article of manufacture further includes additional open-cell foam layers, where each of the additional open-cell foam layers is bonded to and alternated with an additional CMC sheet. The article of manufacture may be a component including a cooled gas turbine engine combustion chamber liner, a non-cooled gas turbine engine combustion chamber liner, a cooled gas turbine engine exhaust liner, a non-cooled gas turbine engine exhaust liner, a cooled rotating blade for a gas turbine, a non-cooled rotating blade for a gas turbine, a cooled vane for a gas turbine, and a non-cooled vane for a gas turbine. Additional or alternate example articles of manufacture include a bladetrack and/or an annulus filler. In certain embodiments, the second CMC sheet includes a thermal and environmental barrier coating. Any of the CMC sheets, and especially any exposed CMC sheets to a heated and/or corrosive environment, may include a thermal and/or environmental barrier coating.

Another exemplary embodiment is a method, including providing a multi-layer ceramic matrix composite (CMC) component having two opposing CMC sheets and an open-cell foam layer therebetween. The method includes exposing one of the CMC sheets directly to high-temperature turbine engine gases, and flowing a coolant fluid through the open-cell foam layer and also through at least one of the CMC sheets. The exemplary method further includes exposing the CMC sheet directly to high-temperature turbine engine gases by flowing turbine engine combustion gases in contact with the CMC sheet. The method may further include rotating the multi-layer CMC component during the exposing, for example where the multi-layer CMC component is a rotating blade including a combustion gas turbine blade mechanically coupled to an upstream compressor blade. In certain embodiments, the method further includes providing a first heat transfer value from the multi-layer CMC component to the coolant fluid that is lower than a second heat transfer value, where the second heat transfer value is a required heat transfer for a metal component. The metal component may be a superalloy, steel, titanium, aluminum, or other metal component that could be configured to provide a mechanically similar function in a similar application.

Yet another exemplary embodiment is a method including forming a first ceramic matrix composite (CMC) sheet, and providing a number of flow paths therethrough. The method further includes rigidizing the first CMC sheet into a component shape and bonding a shaped, open-cell foam layer to the first CMC sheet, where the shaped, open-cell foam layer has a shape corresponding to the component shape. The method further includes forming a second CMC sheet, and bonding the second CMC sheet to the foam layer thereby forming a component structure. The method further includes curing the component structure. In certain embodiments, the method includes providing a number of flow paths through the second CMC sheet before the bonding the second CMC sheet. The flow paths may be provided by perforating the first CMC sheet and/or the second CMC sheet. In certain embodiments, the method includes applying a thermal and environmental barrier coating to the second CMC sheet before the perforating. The perforations for the first CMC sheet and the second CMC sheet may be staggered.

In certain embodiments, the method further includes, before the curing the component structure: rigidizing the second CMC sheet, bonding a second shaped, open-cell foam layer to the second CMC sheet, forming a third CMC sheet, and bonding the third CMC sheet to the second foam layer thereby enlarging the component structure. Certain embodiments of the method include determining a component strength requirement, and in response to the component strength requirement, determining at least one design parameter including: a number of layers each layer comprising an open-cell foam layer interposed between two CMC sheets, a thickness of each of the CMC sheets, a density of the open-cell foam layer, and/or a geometric shape of the component structure. The method further includes conforming the component structure to the design parameter(s). The method further includes, in certain embodiments, determining a component cooling capability requirement, and in response to the component cooling capability requirement, determining at least one design parameter including: a sizing of the flow paths, a shape factor of the flow paths, an alignment value of the flow paths, a thermal and environmental barrier coating design, and/or a density of the open-cell foam layer. The method further includes conforming the component structure to the design parameter(s).

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. An article of manufacture, comprising:
a first ceramic matrix composite (CMC) sheet having a plurality of flow passages therethrough;
a permeable structure layer bonded to the first CMC sheet, wherein the permeable structure layer comprises an open-cell foam layer;
a second CMC sheet bonded to the permeable structure layer;
another open-cell foam layer bonded to the second CMC sheet; and a third CMC sheet bonded to the another open-cell foam layer.

2. The article of manufacture of claim 1, wherein the second CMC sheet further comprises a plurality of flow passages therethrough.

3. The article of manufacture of claim 2, wherein the first CMC sheet and the second CMC sheet comprise a woven ceramic composite, and wherein the plurality of flow passages through the first CMC sheet and the plurality of flow passages through the second CMC sheet comprise gas permeable gaps in the woven ceramic composite.

4. The article of manufacture of claim 2, wherein the plurality of flow passages through the first CMC sheet and the plurality of flow passages through the second CMC sheet comprise perforations.

5. The article of manufacture of claim 4, wherein the perforations in the first CMC sheet and the perforations in the second CMC sheet are staggered.

6. The article of manufacture of claim 1, wherein the manufactured article comprises a component selected from the components consisting of: a cooled gas turbine engine combustion chamber liner, a non-cooled gas turbine combustion chamber liner, a cooled gas turbine engine exhaust liner, a non-cooled gas turbine engine exhaust liner, a cooled rotating blade for a gas turbine, a non-cooled rotating blade for a gas turbine, a cooled vane for a gas turbine, a non-cooled vane for a gas turbine, a bladetrack, and an annulus filler.

7. The article of manufacture of claim 1, wherein at least one of the second CMC sheet and the third CMC sheet comprises a thermal and environmental barrier coating.

8. A method, comprising: providing a multi-layer ceramic matrix composite (CMC) component comprising two opposing CMC sheets and a permeable structure therebetween, wherein the permeable structure is an open-cell foam layer, wherein the two opposing CMC sheets include a first CMC sheet having a plurality of flow passages therethrough, and a second CMC sheet, wherein the permeable structure is bonded to the first CMC sheet and bonded to the second CMC sheet, a third CMC sheet, and another open-cell foam layer disposed between the second CMC sheet and the third CMC sheet, wherein the another open-cell foam layer is bonded to the second CMC sheet and bonded to the third CMC sheet; exposing one of the CMC sheets directly to high-temperature turbine engine gases; and flowing a coolant fluid through the open-cell foam layers and at least one of the CMC sheets.

9. The method of claim 8, wherein the exposing comprises flowing turbine engine combustion gases in contact with the at least one of the CMC sheets.

10. The method of claim 9, further comprising rotating the multi-layer CMC component during the exposing.

11. The method of claim 8, wherein the flowing comprises providing a first heat transfer value from the multi-layer CMC component to the coolant fluid that is lower than a second heat transfer value, the second heat transfer value comprising a required heat transfer for a metal component.

12. A method, comprising: forming a first ceramic matrix composite (CMC) sheet, and providing a plurality of flow paths therethrough; rigidizing the first CMC sheet into a component shape; bonding a shaped, open-cell foam layer to the first CMC sheet; forming a second CMC sheet; rigidizing the second CMC sheet;

bonding the second CMC sheet to the foam layer; bonding a second shaped, open-cell foam layer to the second CMC sheet; forming a third CMC sheet; and bonding the third CMC sheet to the second foam layer, thereby forming a component structure; and curing the component structure.

13. The method of claim 12, further comprising providing a plurality of flow paths through the second CMC sheet before the bonding the second CMC sheet.

14. The method of claim 13, wherein providing the plurality of flow path through the second CMC sheet comprises perforating the second CMC sheet.

15. The method of claim 14, further comprising applying a thermal and environmental barrier coating to the second CMC sheet or the third CMC sheet before the perforating.

16. The method of claim 13, further comprising providing the plurality of flow path through the first CMC sheet and the second CMC sheet by perforating the CMC sheets.

17. The method of claim 16, further comprising staggering the perforations of the first CMC sheet and the second CMC sheet.

18. The method of claim 12, further comprising:

determining a component strength requirement;

in response to the component strength requirement, determining at least one design parameter selected from the parameters comprising: a number of layers each layer comprising an open-cell foam layer interposed between two CMC sheets, a thickness of each of the CMC sheets, a density of the open-cell foam layer, and a geometric shape of the component structure; and conforming the component structure to the at least one design parameter.

19. The method of claim 12, further comprising:

determining a component cooling capability requirement;

in response to the component cooling capability requirement, determining at least one design parameter selected from the parameters comprising: a sizing of the flow paths, a shape factor of the flow paths, an alignment value of the flow paths, a thermal and environmental barrier coating design, and a density of the open-cell foam layer; and conforming the component structure to the at least one design parameter.

\* \* \* \* \*